Sept. 26, 1967  M. F. DAVIS ETAL  3,343,226
FLOW EQUALIZER FOR PARTICULATE MATERIAL
Filed March 19, 1965  3 Sheets-Sheet 3

Morris F. Davis
Richard D. Day
INVENTORS

BY Bertram H. Mann
ATTORNEY

United States Patent Office 3,343,226
Patented Sept. 26, 1967

3,343,226
FLOW EQUALIZER FOR PARTICULATE MATERIAL
Morris F. Davis, Bakersfield, and Richard D. Day, Fresno, Calif., assignors to The Murray Company of Texas, Inc., Dallas, Tex., a corporation of Delaware
Filed Mar. 19, 1965, Ser. No. 441,236
5 Claims. (Cl. 19—205)

ABSTRACT OF THE DISCLOSURE

A flow equalizer to be inserted for instance in the pneumatic flue of a cotton gin plant and including a pair of side-by-side pronged rollers for catching lint delivered through the flue. The rollers delay the transport of the lint so as to equalize the delivery thereof, for instance, to a drier.

---

This invention relates to flow equalizers for particulate material, such as seed cotton, which tends to be fed non-continuously or in batches.

An example of exemplary use of the novel equalizer occurs in a cotton gin plant wherein the seed cotton usually is fed from the wagons or other storage in sequence to a drier and a cleaner prior to delivery to the gins. Where the drier is of the Big Reel type, a screw conveyor delivers the dried cotton in regularly-spaced batches to the cleaners. However, cleaners such as the inclined grid type manufactured by applicants' assignee as well as other cleaners operate more efficiently if the product is delivered to them regularly and continuously rather than in such batches.

Consequently, an object of the present invention is to provide a novel flow equalizer for particulate, flowable materials, such as seed cotton.

Another object is to provide a flow equalizer for insertion in a pneumatic duct which serves to change the transportation rate of the carried material from intermittent to steady and continuous.

Still another object is to provide a flow equalizer of the type described which transforms the delivery rate from intermittent to continuous while bypassing the transport fluid around the equalizer device and then past the device in position for again picking up the product being transported.

These objects and others hereafter appearing are attained by the novel device herein described and claimed which consists, in general, of a casing which may be inserted, for instance, in the pneumatic line or flue which connects the drier in a gin plant with a cleaner. Rotatably mounted in the casing directly below the inlet thereof are a pair of side-by-side rolls having prongs which catch the material delivered through the inlet. The rolls are powered so inlet facing surfaces of the rolls move towards each other and so as to move at a rate considerably less than the rate of delivery of the product thereto so that the product will be expelled from beneath the rolls substantially continuously. Also within the casing is a conduit which passes from the inlet of the casing around the rolls and then beneath them so as to catch the expelled material and deliver it again to the pneumatic duct or flue for continuing its transport to the cleaner.

In the accompanying drawings which illustrate the invention:

Figure 1:
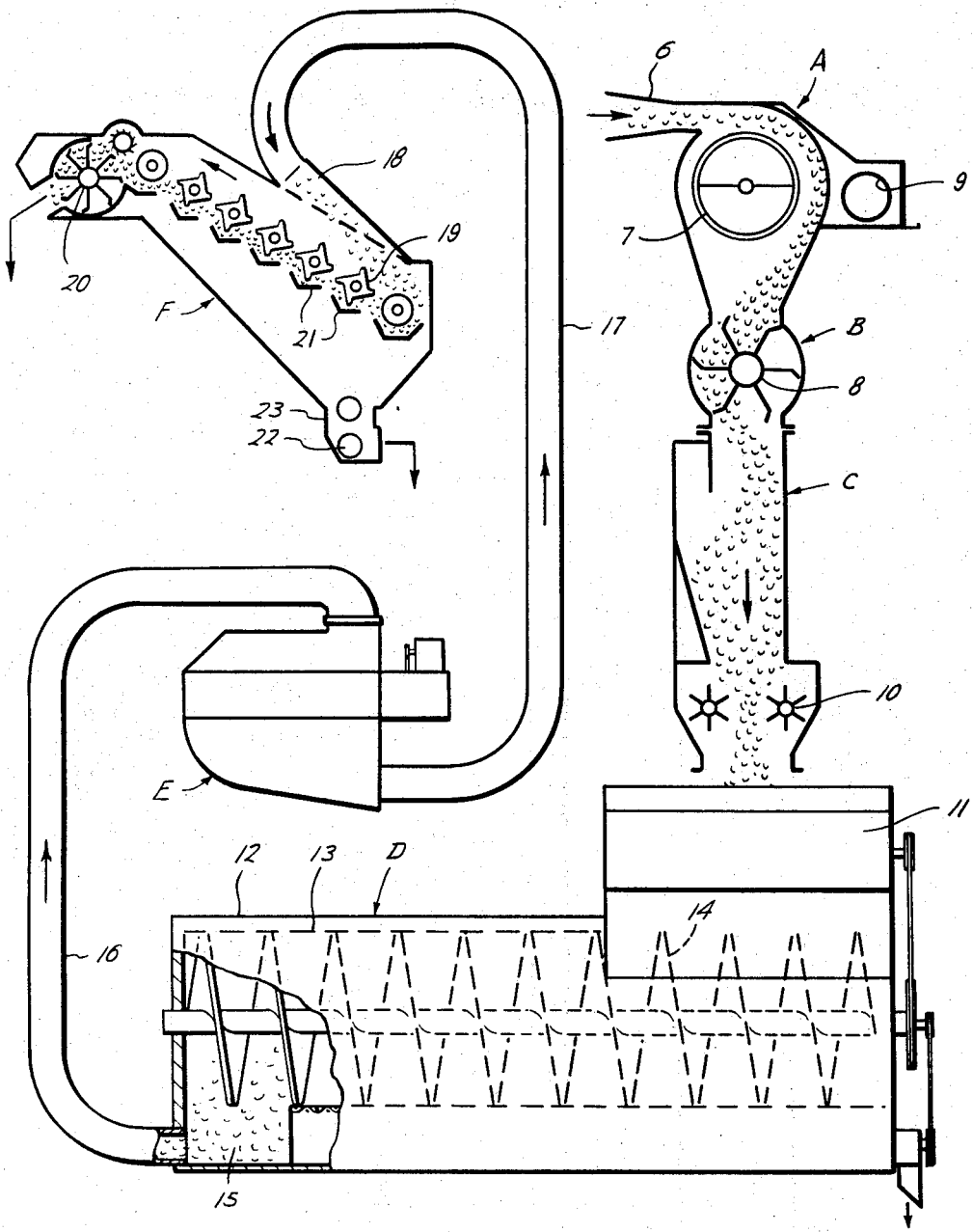
FIG. 1 is a flow diagram illustrating parts of a gin plant.

The parts illustrated in diagrammatic FIG. 1 are a condenser or separator A, a suction seal wheel B, a feeder C, a drier D, the novel flow equalizer E, and an inclined grid-type cleaner F, all arranged sequentially. Seed cotton from the wagons or other source of supply is pneumatically transported through an intake pipe 6 to the screen roll 7 of the condenser A, the cotton passing around the exterior of the roll and dropping upon the flighted seal roll 8, while the carrier fluid passes out through the interior of roll 7 and vent duct 9. The seed cotton then drops by gravity through feeder C onto feed rolls 10 from whence it continues dropping through inlet 11 of drier D. The drier is of the so-called "big reel" type as shown, for instance, in Rylander Patent No. 2,160,253 and has a stationary casing 12 within which rotates a screen cylinder 13 and a continuous screw or spiral baffle 14. A conveyor screw (not shown) is provided at the bottom of casing 12 for disposal of trash dropping through screen 13. From the outlet portion 15 of the drier D, the treated cotton is pneumatically fed through a flue 16 to the flow equalizer E and thence through a pneumatic flue 17 to the inlet 18 of cleaner F. The cotton is carried upwardly by rolls 19 of the cleaner to an air seal wheel 20, while trash is dropped through grids 21 to a conveyor 22 in a trough 23 at the bottom of the cleaner. All of the above, except the flow equalizer E, is conventional and will not be described further.

Since the seed cotton remains at the bottom of screen cylinder 13 in drier D, the cotton is moved along the drier in batches at regular intervals equal to the lead of helical baffle 14 and is so delivered through outlet 15 to pneumatic flue 16. Such delivery of seed cotton to cleaner F would tend to reduce the efficiency of the latter which is designed for handling a continuous stream of cotton. In order to eliminate the intermittent delivery of cotton to the cleaner and/or other equipment provided for subsequent handling and treatment of the cotton, the flow equalizer E is inserted between pneumatic flue sections 16 and 17.

Figure 2:
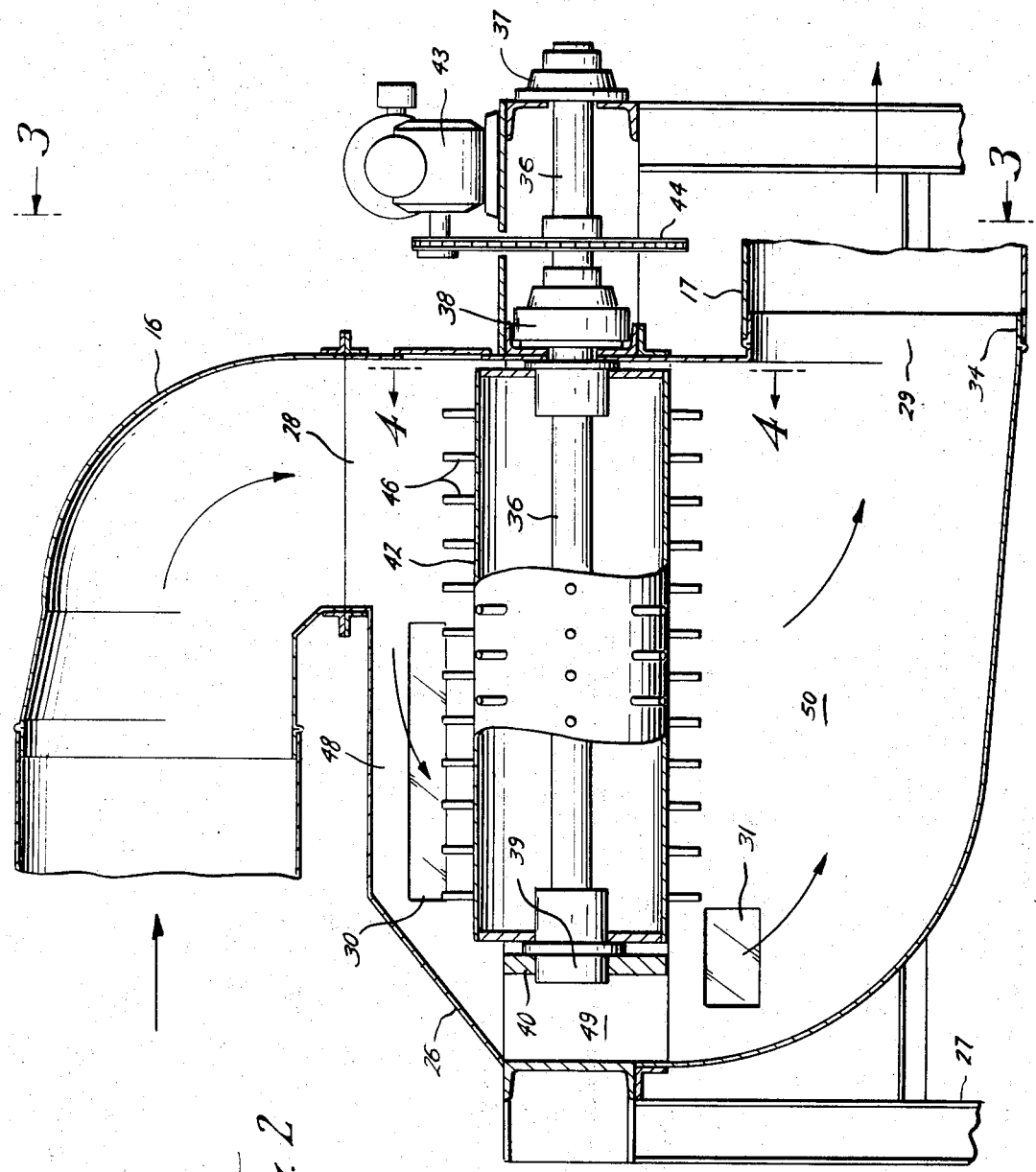
FIG. 2 is an enlarged, vertical section through the equalizer device.
Figure 3:
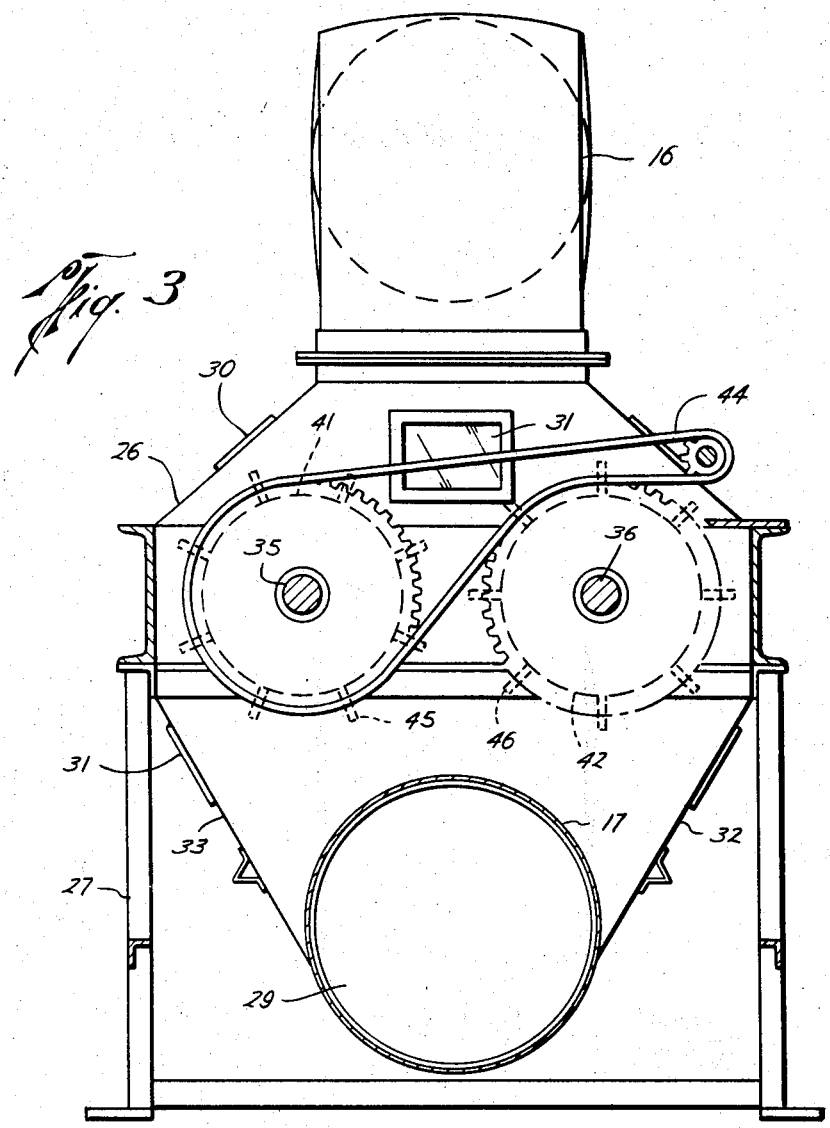
FIG. 3 is an end view of the equalizer device.
Figure 4:
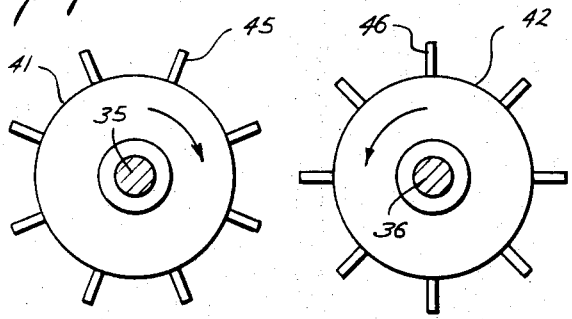
FIG. 4 is a section substantially on line 4—4 of FIG. 2 and illustrating the product restraining rolls.

The equalizer, as best shown in FIGS. 2, 3 and 4, comprises a casing, generally designated 26, supported at a convenient location upon framing 27. Pneumatic flue 16 connects with an inlet 28 at the top of casing 26 and flue 17 connects with outlet 29 at the bottom and at one end of the casing. Observation windows are provided in the casing at 30 and 31. The bottom walls 32 and 33 of the casing converge, as shown, to merge with outlet 29 which is provided with a flange 34 for attachment of delivery flue 17.

A pair of parallel, horizontal shafts 35 and 36 traverse the casing between bearings 37 and 38 at the right end of the casing and a bearing 39 mounted on a cross beam 40 near the left end of the casing (FIG. 2). A pair of cylinder rolls 41 and 42 are rigidly mounted on shafts 35 and 36 with their outer surfaces spaced apart as indicated in FIGS. 3 and 4 and the space between them located directly below inlet 28. The rolls are powered by a motor 43 and chain drive 44 arranged so that the rolls turn oppositely with their upper surfaces approaching each other. Radial pins 45 and 46 project from the surfaces of the rolls for catching cotton dropping through the inlet thereagainst and directing it between the rolls.

Within casing 26 there are provided spaces 48, 49, and 50 which form a bypass conduit for the vehicle air extending from inlet 28 leftwardly along the rolls (FIG. 2), then downwardly around the ends of the rolls, and finally returning beneath the rolls to outlet 29. Thus, the cotton, which blocks the space between the rolls, is discharged downwardly from the rolls and there re-enters the vehicle air stream and is carried therewith through outlet 29 and duct 17. While the seed cotton flows in batches at regular intervals through equalizer inlet 28 and onto rolls 41 and 42, the speed of these rolls is adjusted so that their peripheral surfaces travel at substantially less speed than the rate of travel of the batches entering inlet 28. Since the batches are delivered by the drier at regular intervals, the rate of roll rotation, preferably, will be such as to maintain an accumulation of cotton between the rolls from which the cotton is delivered substantially continuously to the bottom portion 50 of the bypass conduit. Accordingly, a steady stream of properly-dried cotton will be fed through flue 17 to cleaner F.

The novel equalizer may be utilized with other particulate, flowable materials where it is desired to alter the rate of delivery, either from intermittent to continuous or otherwise. Furthermore, other transporting means may be provided both for the main stream of product entering the equalizer and for altering the rate of transport within the equalizer itself. The invention may be modified in these and other respects as will occur to those skilled in the art, and the exclusive use of all modifications as come within the scope of the appended claims is contemplated.

We claim:

1. A flow equalizer for cotton or like flowable material delivered pneumatically and intermittently comprising an inlet for receiving the material and an outlet for delivering the material for further handling, a mechanical conveyor for transporting the material between said inlet and outlet at a substantially reduced rate to thereby produce a substantially uniform delivery of material and a duct for carrying the pneumatic fluid from said inlet to said outlet around the end of said conveyor.

2. A flow equalizer as described in claim 1 in which said conveyor comprises a pair of parallel, oppositely turning rollers beneath said inlet, said duct extending beneath said rollers and being open thereto for receiving the material from said rollers and transporting the same to said outlet.

3. A flow equalizer as described in claim 2 further including projections on the surfaces of said rollers for restraining the passage of the material therebetween.

4. The combination in a gin plant including a drier for seed cotton of the type which delivers the conditioned cotton intermittently, a cleaner, and pneumatic duct means for transporting the conditioned cotton between said drier and cleaner, of a flow equalizer interposed in said duct means comprising a casing having an inlet and an outlet connected, respectively, to said drier and said cleaner, a pair of parallel, side-by-side, oppositely turning rolls directly below said inlet for catching the material delivered through said inlet and directing the same between said rolls, a duct for the pneumatic fluid having parts passing from said inlet around and beneath said rolls, the duct part beneath said rolls being open at the top for receiving the material emerging from said rolls and transporting the same to said outlet, and means for turning said rolls at a peripheral rate substantially less than the rate at which the material is delivered to said rolls for maintaining substantially continuous supply of the material to said outlet and said cleaner.

5. A flow equalizer for insertion in a fluid duct for transporting cotton or like material in batches comprising an inlet and an outlet, a pair of rolls beneath said inlet and arranged side by side and with their peripheries juxtaposed, means for rotating said rolls with the upper surfaces rotating toward each other at a slower linear speed than the rate of delivery of said batches thereto, a conduit extending from said inlet to said outlet around the ends of and beneath said rolls, and structure on said roll surfaces for catching material delivered through said inlet and whereby the material is redelivered substantially continuously to said conduit and said outlet.

References Cited

UNITED STATES PATENTS

| | | | |
|---|---|---|---|
| 1,932,472 | 10/1933 | Mitchell | 19—38 |
| 1,942,868 | 1/1934 | Mitchell | 19—27 |
| 1,988,629 | 1/1935 | Mitchell | 19—27 |
| 2,078,309 | 4/1937 | Bennett | 19—204 |
| 2,099,064 | 11/1937 | Henry | 19—93 |
| 2,653,353 | 9/1953 | Herrmann | 19—93' |

MERVIN STEIN, *Primary Examiner.*

I. C. WADDEY, *Assistant Examiner.*